United States Patent
Park

(10) Patent No.: US 8,629,588 B2
(45) Date of Patent: Jan. 14, 2014

(54) APPARATUS FOR GENERATING ALTERNATING CURRENT POWER BY DIRECT CURRENT SUPPLY BRUSH THAT ROTATES WITH FIELD POLE GENERATOR, AND APPARATUS FOR GENERATING DIRECT CURRENT POWER

(76) Inventor: Jae-Soon Park, Jeollanam-do (KR)

( * ) Notice: Subject to any disclaimer, the term of this patent is extended or adjusted under 35 U.S.C. 154(b) by 162 days.

(21) Appl. No.: 13/382,312

(22) PCT Filed: Jul. 8, 2010

(86) PCT No.: PCT/KR2010/004448
§ 371 (c)(1),
(2), (4) Date: Jan. 5, 2012

(87) PCT Pub. No.: WO2011/005039
PCT Pub. Date: Jan. 13, 2011

(65) Prior Publication Data
US 2012/0113697 A1  May 10, 2012

(30) Foreign Application Priority Data

Jul. 9, 2009 (KR) .................. 10-2009-0062765
Aug. 27, 2009 (KR) .................. 10-2009-0079786

(51) Int. Cl.
*H02K 19/24* (2006.01)
(52) U.S. Cl.
USPC ............... 310/58; 310/59; 310/62; 310/63
(58) Field of Classification Search
USPC .................................. 310/58, 59, 62, 63
See application file for complete search history.

(56) References Cited

U.S. PATENT DOCUMENTS

| 4,424,464 | A | | 1/1984 | Ikegami | |
|---|---|---|---|---|---|
| 4,684,873 | A | * | 8/1987 | Glennon | 322/47 |
| 4,952,828 | A | * | 8/1990 | Yu-fang et al. | 310/68 D |
| 5,907,205 | A | * | 5/1999 | Herman et al. | 310/152 |
| 6,172,437 | B1 | * | 1/2001 | Du | 310/136 |
| 6,707,205 | B2 | * | 3/2004 | Johnsen | 310/114 |
| 7,397,157 | B2 | * | 7/2008 | Maekawa et al. | 310/114 |
| 8,053,939 | B2 | * | 11/2011 | Hayashi | 310/62 |

FOREIGN PATENT DOCUMENTS

| JP | 2004-040958 A | 2/2004 |
|---|---|---|
| JP | 2004-140991 A | 5/2004 |
| JP | 2005-057984 A | 3/2005 |
| JP | 2006-217685 A | 8/2006 |

* cited by examiner

*Primary Examiner* — Bao Q Vu
(74) *Attorney, Agent, or Firm* — Novick, Kim & Lee, PLLC; Jae Youn Kim

(57) ABSTRACT

The present invention relates to an apparatus for generating power by a direct current supply brush that rotates with a field pole generator, the apparatus comprising: a field pole generator which has a plurality of iron cores having a coil or wire wound around; a winding wire used for power generation, the winding wire being formed in such a manner as to wind around the field pole generator; a commutator which is disposed at one end of the field pole generator and has a plurality of commutator segments arranged in a circular shape; a rotating body which has a direct current supply brush adhered to the outer surface of the commutator; a motor for rotating the rotating body; a slip ring secured to a shaft of the motor; and a direct current supply unit for supplying direct current power to the slip ring.

4 Claims, 11 Drawing Sheets

APPARATUS FOR GENERATING ALTERNATING CURRENT POWER BY DIRECT CURRENT SUPPLY BRUSH THAT ROTATES WITH FIELD POLE GENERATOR, AND APPARATUS FOR GENERATING DIRECT CURRENT POWER

TECHNICAL FIELD

The present invention relate to an apparatus for generating alternating current power and direct current power, and more particularly, to such an apparatus for generating alternating current power and direct current power, in which direct current is supplied to a field pole generator including a plurality of iron cores each having a winding coil wound therearound by a direct current supply brush configured to be rotated, so that a magnetic field having a magnetic force is induced in the respective iron cores of the field pole generator, and a magnetic field having a polarity opposite to that of the magnetic field of the iron cores of the field pole generator is induced in a pair of opposed winding wires for power generation, which surrounds the field pole generator so as to generate electric current.

BACKGROUND ART

In general, an electric generator is largely classified into an alternating current generator and a direct current generator. The alternating current generator includes a rotor, a stator formed at the outside of the rotor, and a hollow cylindrical casing that holds the stator. When the rotor is rotated, a magnetic flux generated from a magnet of the rotor interacts with a winding wire of the stator to induce electric current in the winding wire of the stator. Generally, the stator is concentrically disposed within a casing of the rotor, and includes a soft magnetic core and an electrically conductive winding wire. Electric power supplied by the alternating current generator varies depending on the rotational speed of the rotor. In this case, the stator may be concentrically disposed within the rotor in an alternating manner. In other words, an alternating current power generation principle is as follows. An N-pole is arranged at a left side and an S-pole is arranged at a right side, and a coil continues to be rotated in a counterclockwise direction in a state of being perpendicular to a magnetic line of force. When the coil is rotated by 0 to 90 degrees, the magnetic flux generated from the coil is increased, and an N-pole side coil and an S-pole side coil simultaneously produce an induced electromotive force in a counterclockwise direction. In addition, when the coil is rotated by 90 to 180 degrees, the magnetic flux generated from the coil is decreased, and the N-pole side coil and the S-pole side coil simultaneously produce an induced electromotive force in a clockwise direction so as to generate electric current.

In the meanwhile, the direct current generator includes a rotor, a stator formed at the outside of the rotor, and a hollow cylindrical casing that holds the stator. When the rotor is rotated, a magnetic flux generated from a magnet of the rotor interacts with a winding wire of the stator to induce electric current in the winding wire of the stator. Generally, the stator is concentrically disposed within a casing of the rotor, and includes a soft magnetic core and an electrically conductive winding wire. Electric power supplied by the direct current generator varies depending on the rotational speed of the rotor. In this case, the stator may be concentrically disposed within the rotor in an alternating manner.

DISCLOSURE OF INVENTION

Technical Problem

However, such a conventional alternating current generator or direct current generator is constructed such that the rotor is disposed concentrically with respect to the stator fixedly mounted on a rotating shaft and interacts with the stator while being rotated within the stator by the torque of a power source to generate an electromotive force, at which time the electromotive force cycle is repeated continuously to generate electric current. Consequently, since the rotor must be rotated forcibly by the power source in order to generate electric current using the conventional electric power generating apparatus (e.g., alternating current generating apparatus, direct current generating apparatus), the power generation efficiency is disadvantageously decreased by dissipation of energy required to rotate a considerably heavy rotor, friction, and other factors.

Technical Solution

Accordingly, the present invention has been made in order to solve the above-mentioned problems, and it is an object of the present invention to provide an electric power generating apparatus in which the rotor required to be rotated to generate electric current in the conventional electric power generating apparatus is replaced with a field pole generator including a plurality of iron cores each having a winding coil wound therearound and configured not to be rotated, and direct current can be selectively supplied to the respective winding coils of the field pole generator by a direct current supply brush configured to be rotated, such that a magnetic field having a magnetic force is induced in the respective iron cores of the field pole generator and a magnetic field having a polarity opposite to that of the magnetic field of the iron cores is induced in a pair of opposed winding wires for power generation, which surrounds the field pole generator, and thus electric current is generated by the repeated generation and annihilation of the electromotive force induced in the winding wire for power generation.

Advantageous Effects

As described above, the present invention is useful because there is no need to forcibly rotate the field pole generator in order to obtain electric current, so that resources and energies required for the mandatory rotation of the field pole generator as well as superfluous facilities are no longer needed, thereby enabling low-cost power generation.

In other words, the present invention is useful because a lightweight brush but not a heavyweight rotor is rotated to obtain electric current to cause electric current to be produced by the repeated generation and annihilation of an electromotive force induced in the winding wire for power generation, so that an electric generator can be provided which has increased efficiency while minimizing energy consumption as compared to a conventional electric generator.

Figure 1:
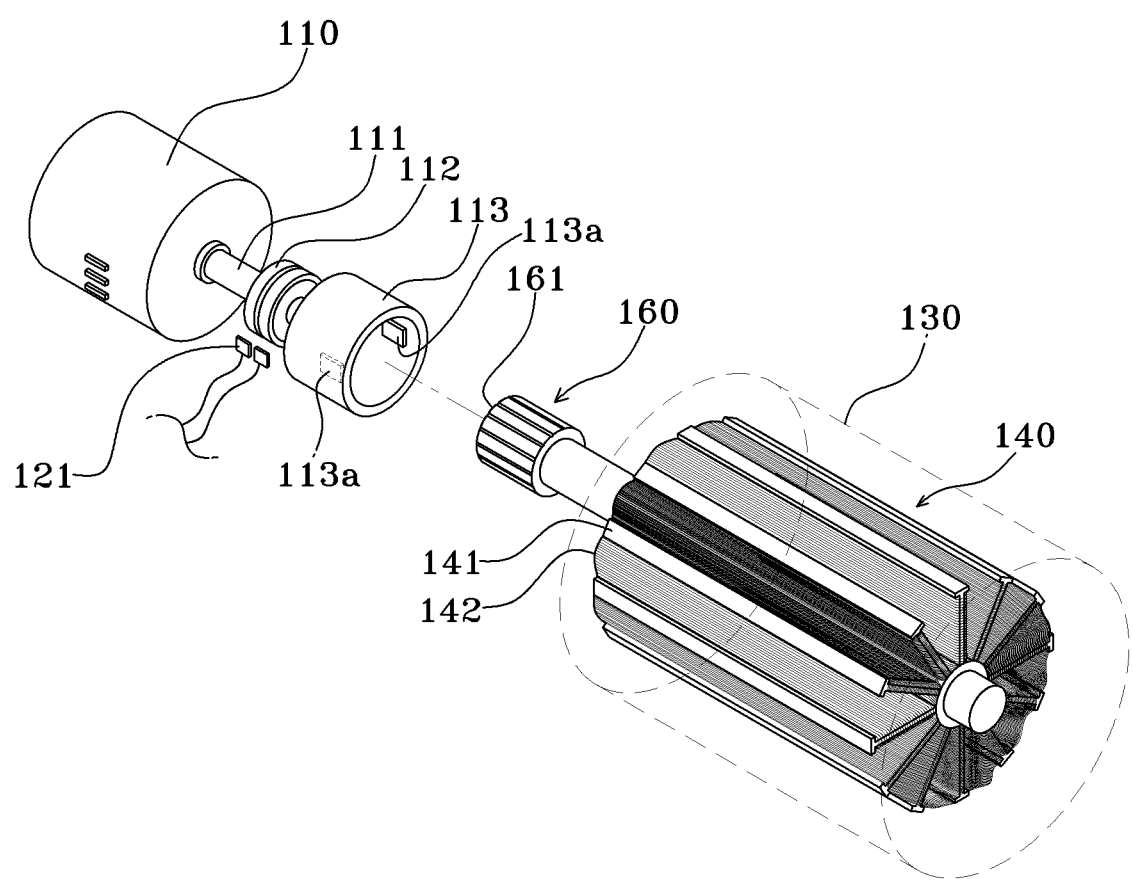
FIG. 1 is an exploded perspective view illustrating an apparatus for generating alternating current power according to a first embodiment of the present invention.

<Explanation on reference numerals of main elements of the drawings>

| | |
|---|---|
| 100: | apparatus for generating alternating current power according to the present invention |
| 100': | apparatus for generating direct current power according to the present invention |
| 110, 110': | motor |
| 111, 111': | shaft |
| 112, 112': | slip ring |
| 113, 113': | rotating body |
| 113a, 113a': | direct current supply brush |
| 120, 120': | storage battery |
| 121, 121': | brush |
| 130, 130': | casing |
| 140, 140': | field pole generator |
| 141, 141': | iron core |
| 142, 142': | winding coil |
| 150, 150': | winding wire for power generation |
| 160, 160': | commutator |
| 161, 161': | commutator segments |
| 170: | inverter |

Now, an apparatus for generating alternating current power using a field pole generator and a rotatable direct current supply brush according to the present invention will be described hereinafter in detail with reference to FIGS. 1 to 5.

The apparatus for generating alternating current power according to the present invention includes: a field pole generator 140 including a plurality of iron cores 141 each having a winding coil 142 wound therearound; a winding wire 150 used for power generation, the winding wire being formed to surround the circumference of the field pole generator 140 in such a fashion as to divide the circumference of the field pole generator into two parts and to be spaced apart from the outer circumference of the field pole generator 140' by a predetermined interval; a commutator 160 disposed at one end of the field pole generator 140 and having a plurality of commutator segments 161 arranged in a circular shape, the commutator segments being connected to the respective winding coils 142 in a one-to-one correspondence; a rotating body 113 including a direct current supply brush 113a closely adhered to the outer circumferential surface of the commutator 160; a motor 110 configured to rotate the rotating body 113; a slip ring 112 mounted on a shaft 111 of the motor 110; and a direct current supply unit configured to supply direct current power to the slip ring 112.

The direct current supply unit includes a brush 121 configured to supply direct current power to the slip ring 112 without interrupting the rotation of the motor shaft 111, and a storage battery 120 configured to store the direct current power therein.

In the present invention, the field pole generator 140 and the winding wire 150 for power generation are structured in such a manner as to be securely fixed to a casing 130. The winding coils 142 are wound around the respective iron cores 141 of the field pole generator 140 so as to generate magnetic poles.

Figure 2:
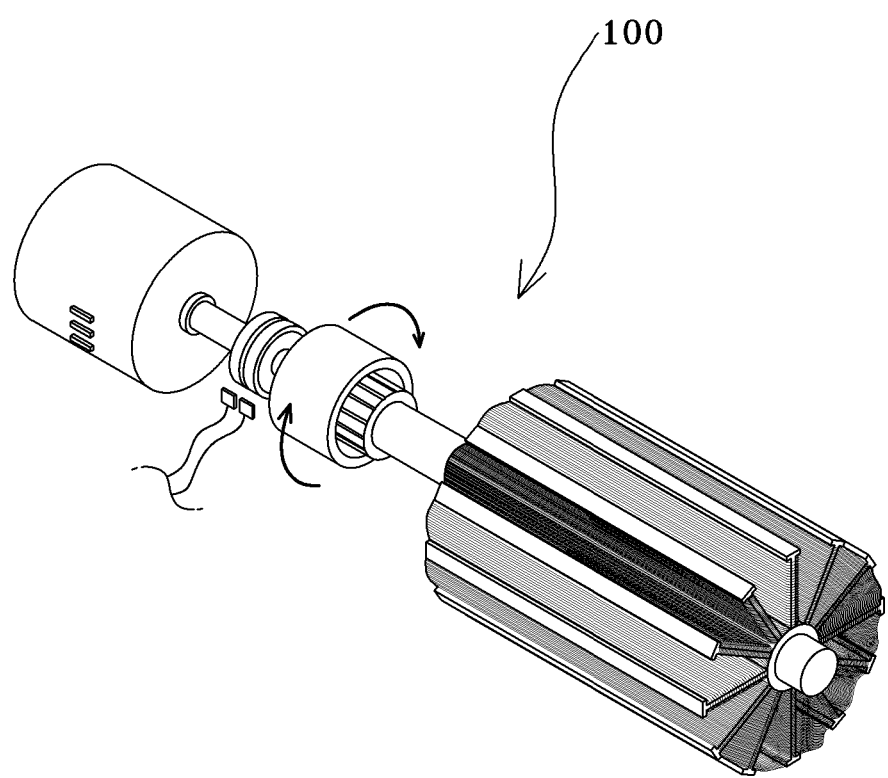
FIG. 2 is an assembled perspective view illustrating an apparatus for generating alternating current power of FIG. 1.
Figure 3:
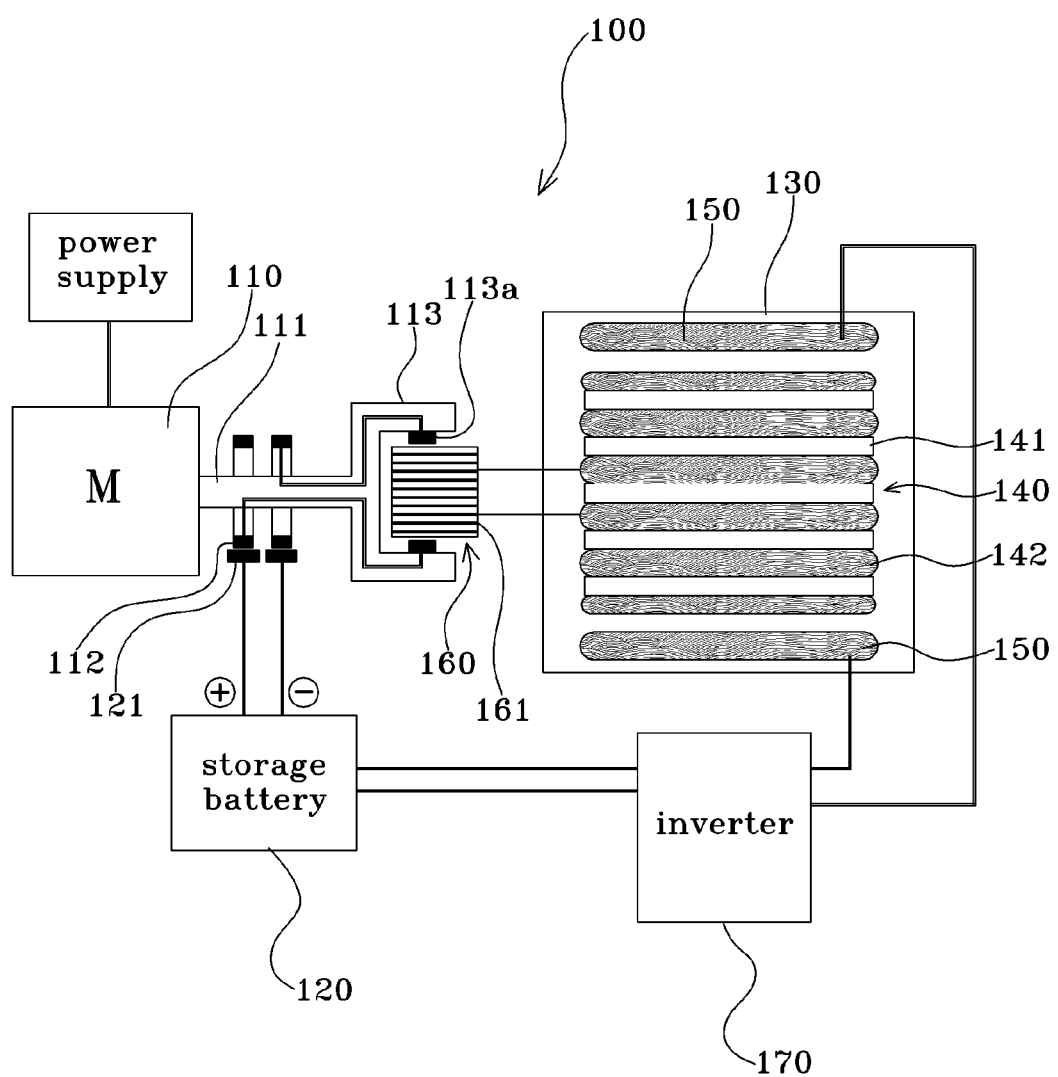
FIG. 3 is a schematic block diagram illustrating the construction of an apparatus for generating alternating current power of FIG. 1.

As shown in FIG. 2, a winding coil 142 is wound around each of the iron cores 141 of the field pole generator 140, and the respective winding coils 142 are connected to a plurality of commutator segments 161 in a one-to-one correspondence by coil filaments 161a.

Direct current power is supplied to the commutator segments 161 by a direct current supply brush 113a. The commutator segments 161 are constructed such that a positive polarity (+) and a negative polarity (−) are formed on each pair of opposed commutator segments, respectively. In this case, electric current of the positive polarity (+) and a negative polarity (−) flows in corresponding winding coils 142 of the field pole generator 140.

Thus, when the positive polarity (+) and the negative polarity (−) are formed on the winding coils 142 of the field pole generator 140, a magnetic force is generated from the iron cores 141 of the field pole generator 140. At this time, since a corresponding winding coil 142 is wound around each of the iron cores 141 of the field pole generator 140 in a given direction, each of a plurality of opposed pairs of iron cores has an N-pole or an S-pole at one sides thereof and has an S-pole or an N-pole at the other sides thereof, which is a polarity opposite to that at the one side, based on a shaft of the field pole generator 140. Accordingly, a magnetic force having a polarity opposite to that of the each pair of opposed iron cores 141 of the field pole generator 140 is induced in the pair of opposed winding wires 150 for power generation, which surrounds the field pole generator 140.

Consequently, the direct current supply brush 113a is rotated in a state of being in close contact with the outer circumferential surface of the commutator 160 by a rotating body 113 that is rotated by a motor 110, so that electric current of a positive polarity (+) and electric current of a negative polarity (−) are sequentially supplied to the respective commutator segments 161, and thus an N-polar magnetic force and an S-polar magnetic forces are sequentially generated in the iron cores 141 of the field pole generator 140 to cause an electromotive force to be induced in the winding wire 150 for power generation to generate an alternating current, which is in turn outputted through an electric wire 180 for withdrawal of electric current, which is electrically connected to the winding wire 150 for power generation.

In the present invention, the commutator 160 is constructed such that direct current power is dividedly supplied to the winding coils 142 of the field pole generator 140. In this case, the commutator is composed of a plurality of commutator segments, which is insulated from each other by a thin mica piece and is formed in a wedge shape.

Figure 4:
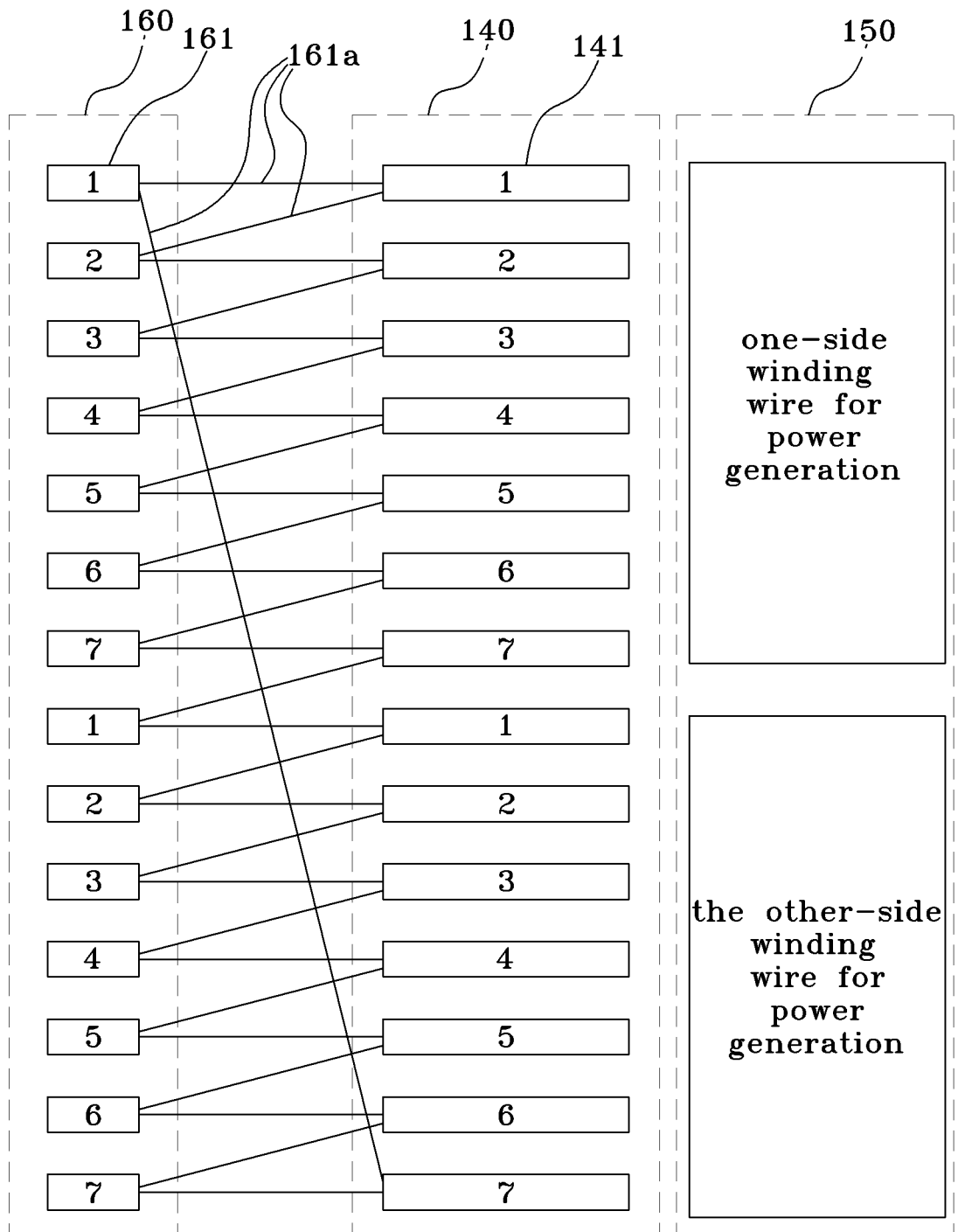
FIG. 4 is a reference diagram illustrating a coil winding state between commutator segments and iron cores of a field pole generator in an apparatus for generating alternating current power shown in FIG. 1.
Figure 5:
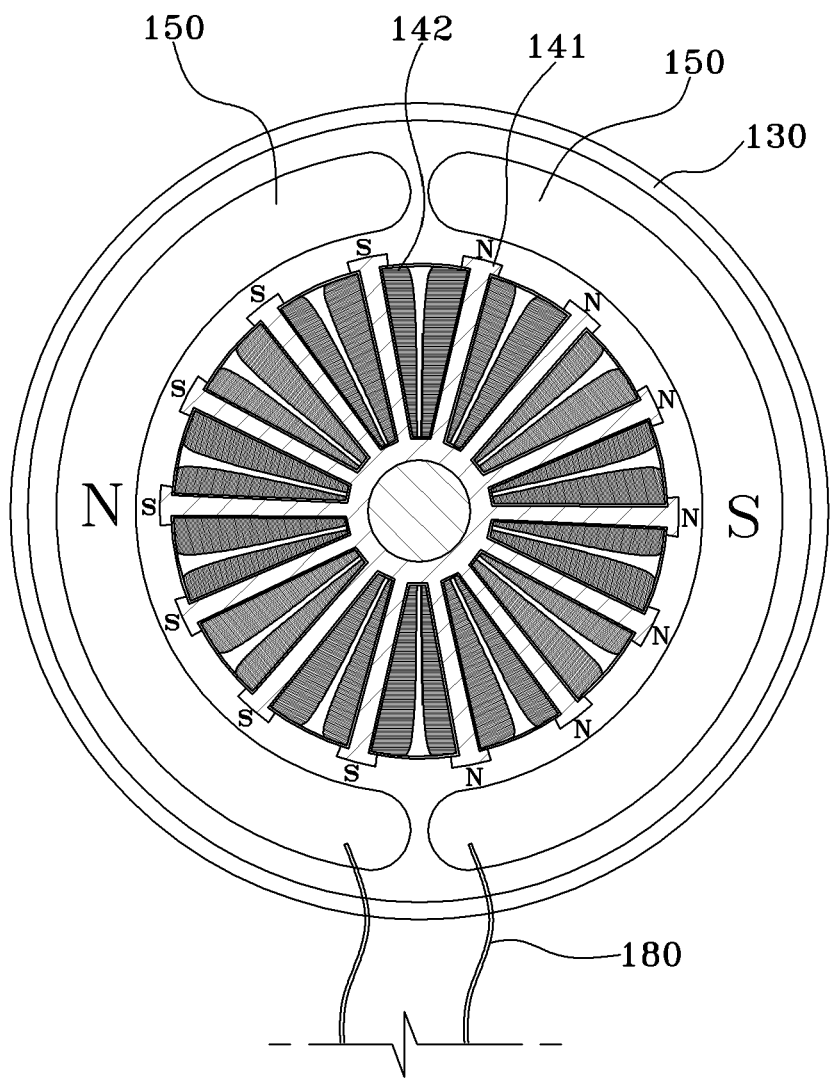
FIG. 5 is a reference diagram illustrating a magnetic force forming state between a field pole generator and a winding wire for power generation in an apparatus for generating alternating current power shown in FIG. 1.

A power generation principle of the present invention will be described in more detail with reference to FIG. 4.

That is, when it is assumed that a pair of opposed direct current supply brushes 113a is electrically connected to a first one (+ polarity) and a 1a-th one (− polarity) of the commutator segments 161, respectively, first to seventh iron cores 141 of the field pole generator 140 have an S-pole, and 1a-th to 7a-th iron cores of the field pole generator 140 have an N-pole. In this case, an N-pole is induced in one half winding wire 150 for power generation, which is adjacent to the first to seventh iron cores 141, and an S-pole is induced in the other half winding wire 150 for power generation, which is adjacent to the 1a-th to 7a-th iron cores 141.

Next, when the direct current supply brush 113a is rotated to be simultaneously brought into close contact with the first and second ones and the 1a-th and 2a-th ones of the commutator segments 161, the polarities of the first one and the 1a-th one of the iron cores 141 of the field pole generator 140 disappear. Then, when the direct current supply brush 113a is rotated to be brought into close contact with the second one and the 2a-th one of the commutator segments 161, the second to 2a-th ones of the iron cores 141 of the field pole generator 140 have an S pole, and the 2a-th to first ones of the iron cores 141 of the field pole generator 140 have an N-pole.

The direct current supply brush 113a is rotated to cause polarity to be alternately changed in the above-mentioned order in the field pole generator 140 and the winding wire 150 for power generation to induce an electromotive force, and thus to generate electric current from the winding wire 150 for power generation.

As such, the present invention is constructed such that the direct current supply brush being rotated supplies the direct current power generated by the direct current supply unit to the field pole generator, and the magnetic force produced by the field pole generator generates an induced electromotive force in the winding wire for power generation in order to obtain electric current. Thus, the present invention can increase the amount of electric current generated by increasing the rotational speed of the direct current supply brush or the number of field poles.

Now, an apparatus for generating direct current power using a field pole generator and a rotatable direct current supply brush according to the present invention will be described hereinafter in detail with reference to FIGS. 6 to 11.

The apparatus for generating direct current power according to the present invention includes: a field pole generator 140' including a plurality of iron cores 141' each having a winding coil 142 wound therearound; a winding wire 150' used for power generation, the winding wire being formed to surround the circumference of the field pole generator 140' in such a fashion as to divide the circumference of the field pole generator into two parts and to be spaced apart from the outer circumference of the field pole generator 140' by a predetermined interval; a commutator 160' disposed at one end of the field pole generator 140' and having a plurality of commutator segments 161 arranged in a circular shape, the commutator segments being connected to the respective winding coils 142' in a one-to-one correspondence; a rotating body 113' including a direct current supply brush 113a' closely adhered to the outer circumferential surface of the commutator 160'; a motor 110' configured to rotate the rotating body 113'; a slip ring 112 mounted on a shaft 111' of the motor 110'; and a direct current supply unit configured to supply direct current power to the slip ring 112.

The term "the predetermined interval" as used herein refers to a distance that is enough for the field pole generator 140' to be not interrupted during the rotation of the field pole generator 140' within the winding wire 150' for power generation.

The direct current supply unit includes a brush 121 configured to supply direct current power to the slip ring 112 without interrupting the rotation of the motor shaft', 111a direct current generating unit configured to supply the direct current power therein, a storage battery 120'.

In the present invention, the field pole generator 140' and the winding wire 150' for power generation are structured in such a manner as to be securely fixed to a casing 130'. The winding coils 142' are wound around the respective iron cores 141' of the field pole generator 140' so as to generate magnetic poles.

Figure 6:
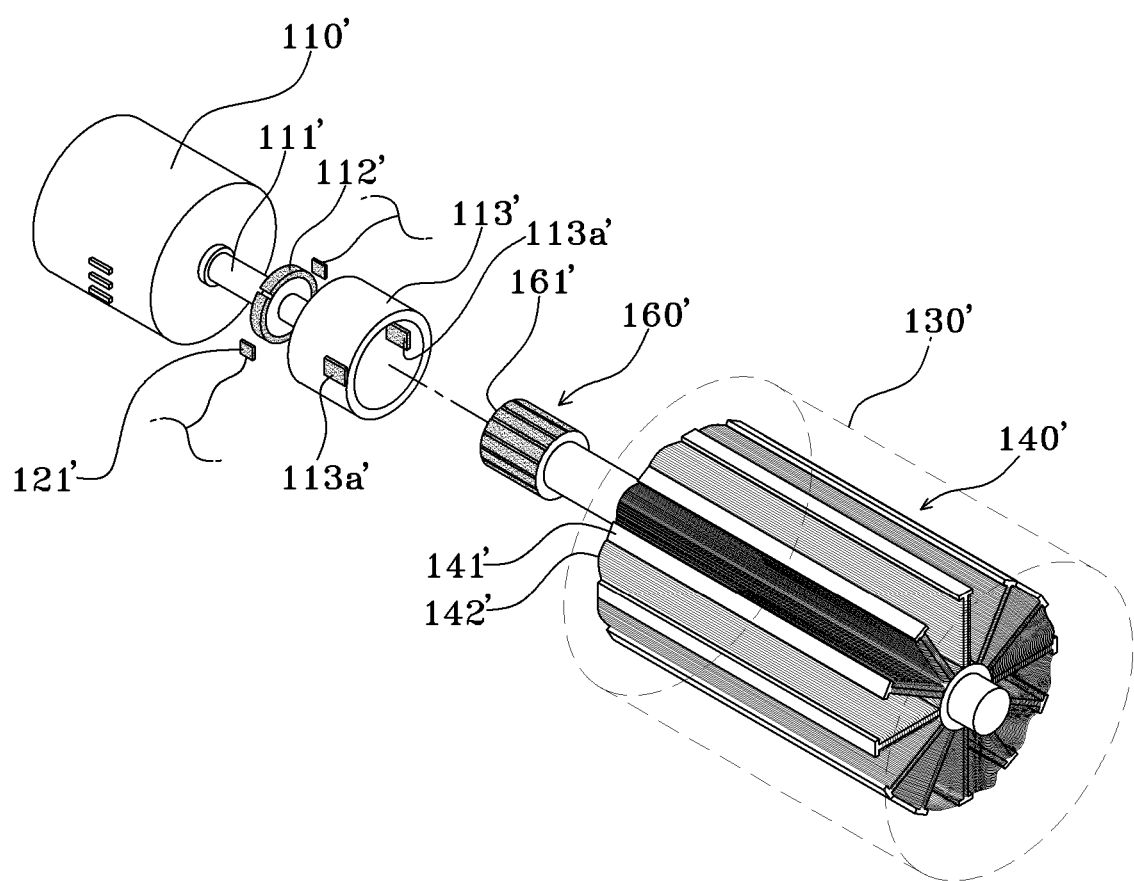
FIG. 6 is an exploded perspective view illustrating an apparatus for generating direct current power according to a second embodiment of the present invention.
Figure 7:
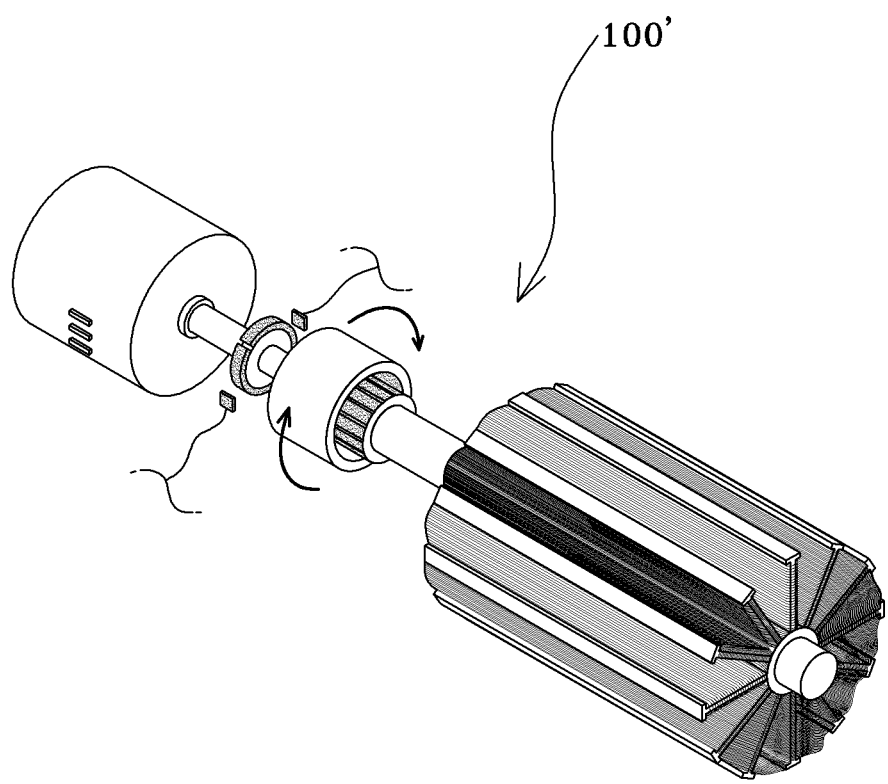
FIG. 7 is an assembled perspective view illustrating an apparatus for generating direct current power of FIG. 6.

As shown in FIG. 6, a winding coil 142 is wound around each of the iron cores 141 of the field pole generator 140', and the respective winding coils 142' are connected to a plurality of commutator segments 161' in a one-to-one correspondence by coil filaments 161a'.

Direct current power is supplied to the commutator segments 161' by a direct current supply brush 113a'. The commutator segments 161' are constructed such that a positive polarity (+') and a negative polarity (−') are formed on each pair of opposed commutator segments, respectively. In this case, electric current of the positive polarity (+') and a negative polarity (−') flows in corresponding winding coils 142' of the field pole generator 140'. Thus, when the positive polarity (+') and the negative polarity (−') are formed on the winding coils 142' of the field pole generator 140', a magnetic force is generated from the iron cores 141' of the field pole generator 140'. At this time, since a corresponding winding coil 142' is wound around each of the iron cores 141' of the field pole generator 140' in a given direction, each of a plurality of opposed pairs of iron cores has an N-pole or an S-pole at one sides thereof and has an S-pole or an N-pole at the other sides thereof, which is a polarity opposite to that at the one side, based on a shaft of the field pole generator 140'.

Figure 8:
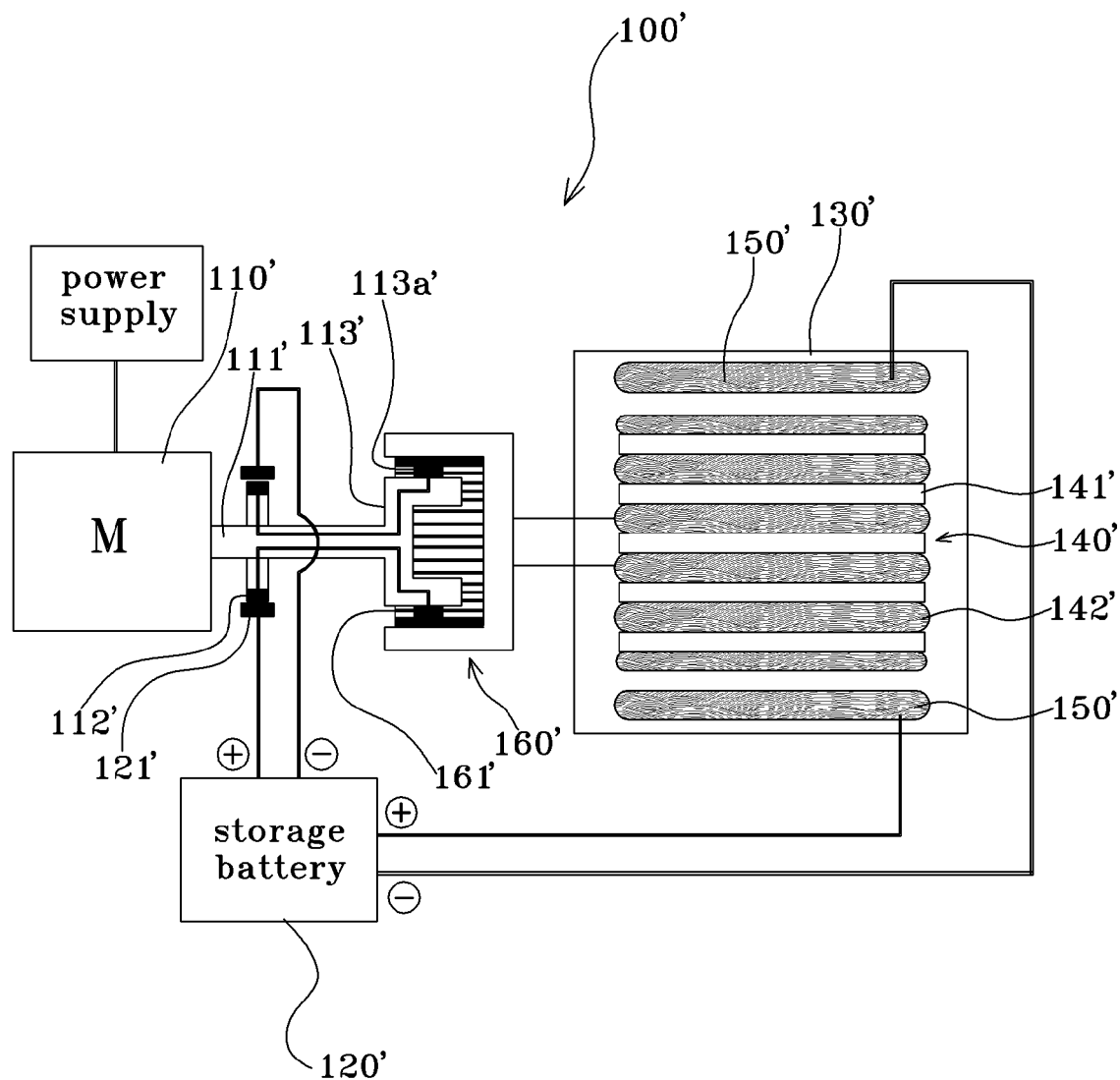
FIG. 8 is a schematic block diagram illustrating the construction of an apparatus for generating direct current power of FIG. 6.

Accordingly, a magnetic force having a polarity opposite to that of the each pair of opposed iron cores 141' of the field pole generator 140' is induced in the pair of opposed winding wires 150' for power generation, which surrounds the field pole generator 140'. Consequently, the direct current supply brush 113a' is rotated in a state of being in close contact with the outer circumferential surface of the commutator 160' by a rotating body 113' that is rotated by a motor 110', so that electric current of a positive polarity (+') and electric current of a negative polarity (−') are sequentially supplied to the respective commutator segments 161', and thus an N-polar magnetic force and an S-polar magnetic forces are sequentially generated in the iron cores 141' of the field pole generator 140' to cause an electromotive force to be induced in the winding wire 150' for power generation to generate an direct current, which is in turn outputted through an electric wire 180' for withdrawal of electric current, which is electrically connected to the winding wire 150' for power generation As shown in FIG. 8, the present invention is constructed such that the direct current supply brush 113a it is disposed on the inner surface of the rotating body 113 and is brought into close contact with the commutator segments 161' formed on the outer circumferential surface of the commutator' 160, so that when rotating body 1'13 is rotated, the direct current supply brush 113a' is detached from the commutator segments 161' of the commutator 160 by a centrifugal force thereof, thereby disadvantageously decreasing a current generating efficiency.

Figure 11:
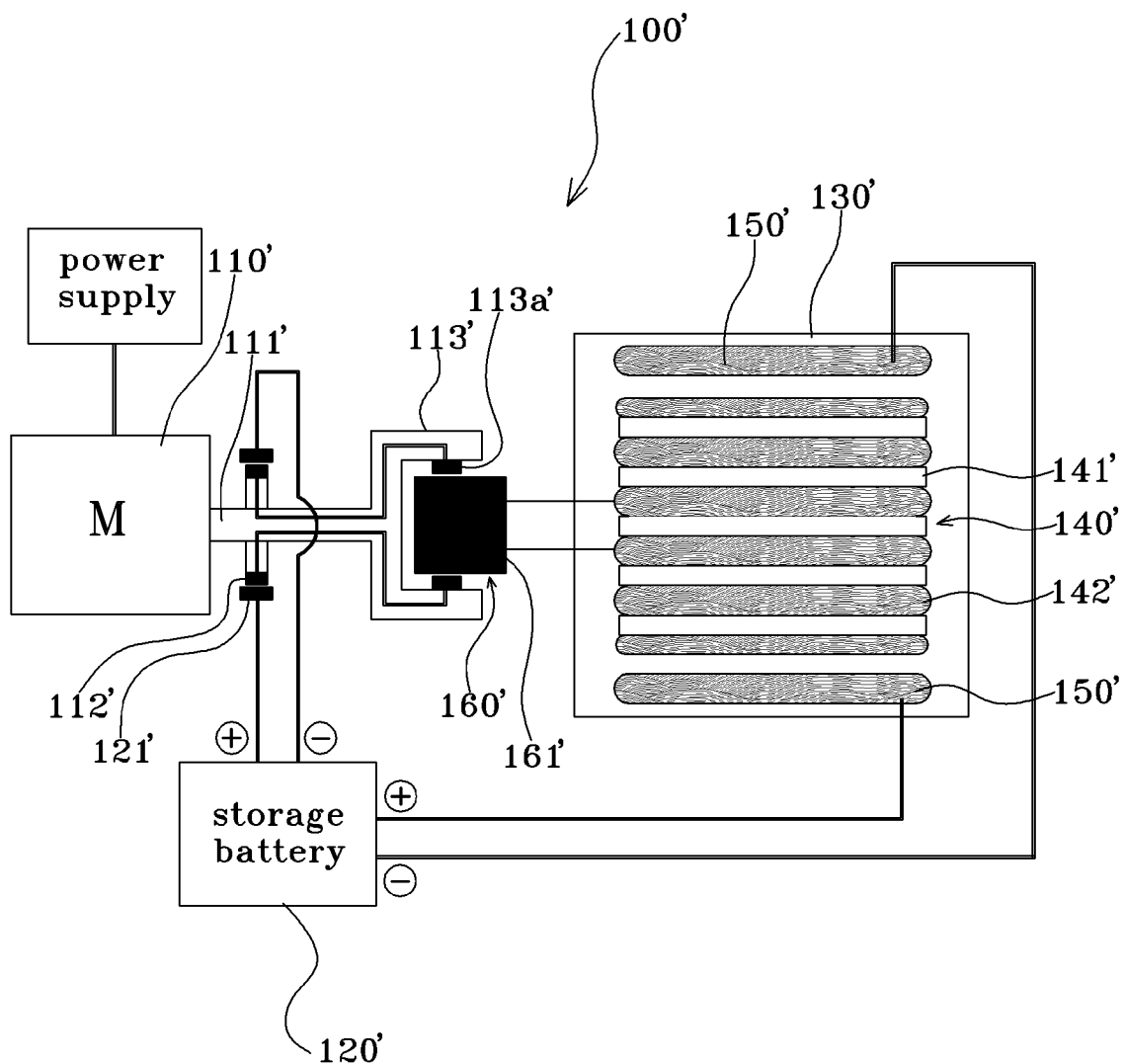
FIG. 11 is another schematic block diagram illustrating the construction of an apparatus for generating direct current power of FIG. 6.

Thus, in order to address such a disadvantage, the present invention may be constructed such that the direct current supply brush 113a' is disposed on the outer circumferential surface of the rotating body 113' and the commutator segments 161' are formed in a circular shape on the inner circumferential surface of the commutator 160' in such a manner that the rotating body 113' is inserted into the commutator 160 so that as a centrifugal force is gradually applied to the direct current supply brush 113a' by the rotation of the rotating body 113', the close contacting force between the direct current supply brush 113a' and the commutator segments 161' of the commutator 160' can be improved as shown in FIG. 11.

In the present invention, the commutator 160' is constructed such that direct current power is dividedly supplied to the winding coils 142' of the field pole generator 140'. In this case, the commutator is composed of a plurality of commutator segments, which is insulated from each other by a thin mica piece and is formed in a wedge shape.

Figure 9:
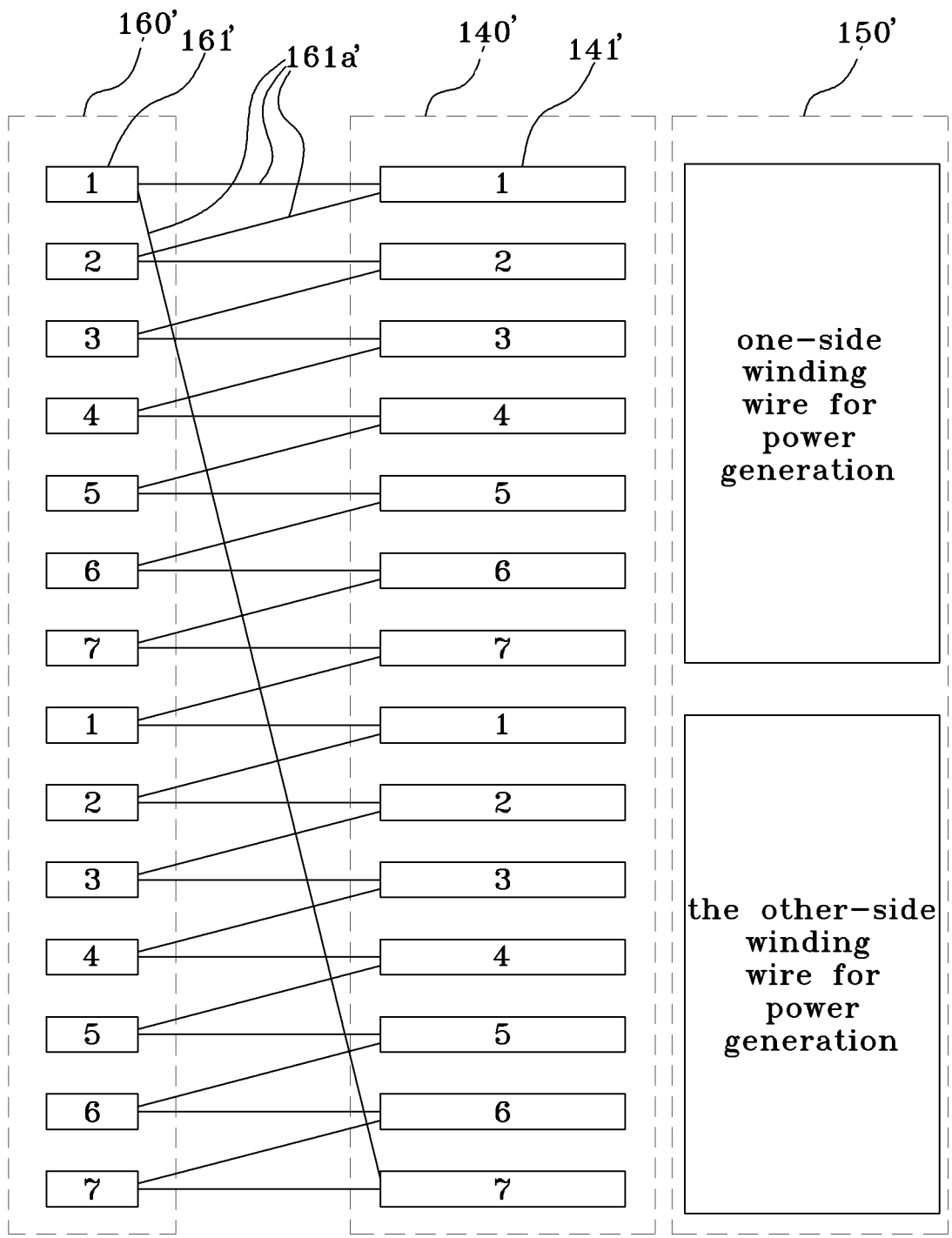
FIG. 9 is a reference diagram illustrating a coil winding state between commutator segments and iron cores of a field pole generator in an apparatus for generating direct current power shown in FIG. 6.
Figure 10:
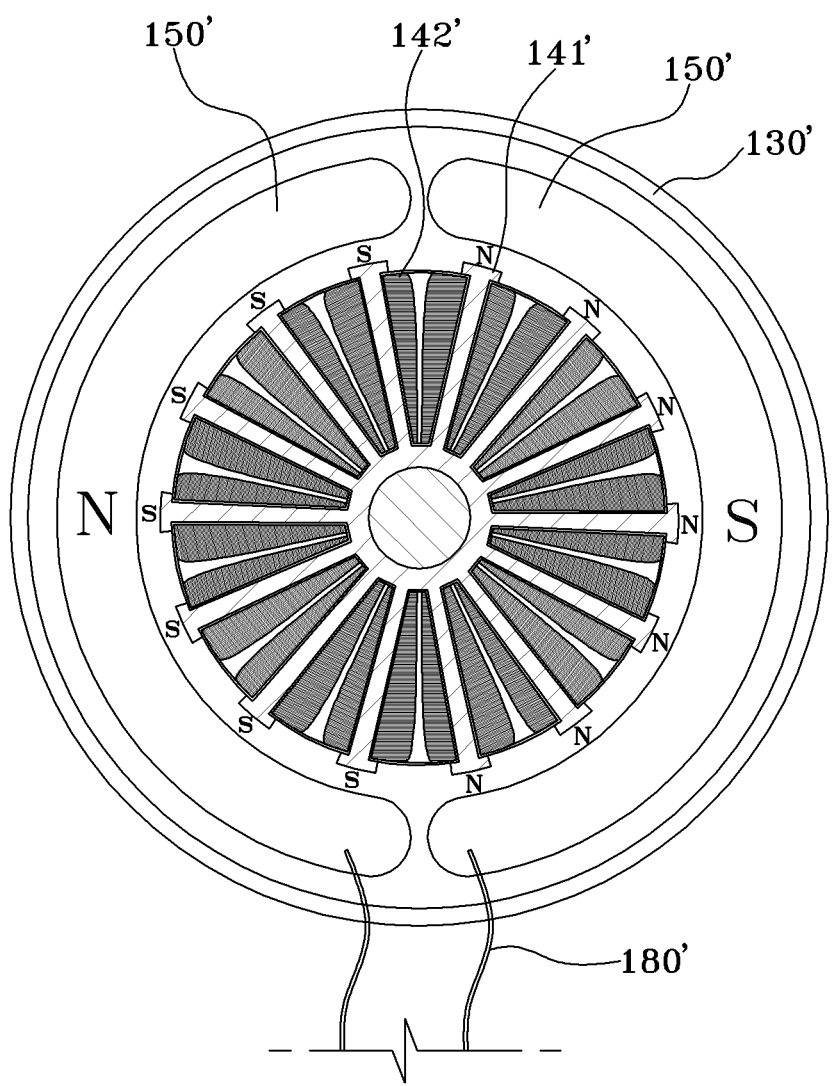
FIG. 10 is a reference diagram illustrating a magnetic force forming state between a field pole generator and a winding wire for power generation in an apparatus for generating direct current power shown in FIG. 6.

A power generation principle of the present invention will be described in more detail with reference to FIG. 9. That is, when it is assumed that a pair of opposed direct current supply brushes 113a' is electrically connected to a first one (+ polarity) and a 1a-th one (− polarity) of the commutator segments 161', respectively, first to seventh iron cores 141' of the field pole generator 140' have an S-pole, and 1a-th to 7a-th iron cores of the field pole generator 140' have an N-pole.

In this case, an N-pole is induced in one half winding wire 150' for power generation, which is adjacent to the first to seventh iron cores 141', and an S-pole is induced in the other half winding wire 150' for power generation, which is adjacent to the 1a-th to 7a-th iron cores 141'. Next, when the direct current supply brush 113a' is rotated to be simultaneously brought into close contact with the first and second ones and the 1a-th and 2a-th ones of the commutator segments 161', the polarities of the first one and the 1a-th one of the iron cores 141' of the field pole generator 140' disappear. Then, when the direct current supply brush 113a' is rotated to be brought into close contact with the second one and the 2a-th one of the commutator segments 161', the second to 1a-th ones of the iron cores 141' of the field pole generator 140' have an S pole, and the 2a-th to first ones of the iron cores 141' of the field pole generator 140' have an N-pole. The direct current supply brush 113a' is rotated to cause polarity to be alternately changed in the above-mentioned order in the field pole generator 140' and the winding wire 150' for power generation to induce an electromotive force, and thus to generate electric current from the winding wire 150' for power generation.

As such, the present invention is constructed such that the direct current supply brush being rotated supplies the direct current power generated by the direct current supply unit to the field pole generator, and the magnetic force produced by the field pole generator generates an induced electromotive force in the winding wire for power generation in order to obtain electric current. Thus, the present invention can increase the amount of electric current generated by increasing the rotational speed of the direct current supply brush or the number of field poles.

While the present invention has been described with respect to the certain specific embodiments, it will be obvious to a person of ordinary skill in the art that the present invention is not limited to the above embodiments, but various equivalent modifications and variations to the disclosed embodiments can be made without departing from the spirit and scope of the present invention. Therefore, it is intended that the appended claims cover all such modifications and variations as fall within the true spirit and scope of the invention.

The invention claimed is:

1. An apparatus for generating alternating current power using a field pole generator and a rotatable direct current supply brush, the apparatus comprising:
   a field pole generator including a plurality of iron cores each having a winding coil wound therearound;
   a winding wire used for power generation, the winding wire being formed to surround the circumference of the field pole generator in such a fashion as to divide the circumference of the field pole generator into two parts and to be spaced apart from the outer circumference of the field pole generator by a predetermined interval;
   a commutator disposed at one end of the field pole generator and having a plurality of commutator segments arranged in a circular shape, the commutator segments being connected to the respective winding coils in a one-to-one correspondence;
   a rotating body including a direct current supply brush closely adhered to the outer circumferential surface of the commutator;
   a motor configured to rotate the rotating body;
   a slip ring mounted on a shaft of the motor; and
   a direct current supply unit configured to supply direct current power to the slip ring.

2. The apparatus according to claim 1, wherein the direct current supply unit comprises a brush configured to supply direct current power to the slip ring without interrupting the rotation of the motor shaft, and a storage battery configured to store the direct current power therein.

3. An apparatus for generating direct current power using a field pole generator and a rotatable direct current supply brush, the apparatus comprising:
   a field pole generator including a plurality of iron cores each having a winding coil wound therearound;
   a winding wire used for power generation, the winding wire being formed to surround the circumference of the field pole generator in such a fashion as to divide the circumference of the field pole generator into two parts and to be spaced apart from the outer circumference of the field pole generator by a predetermined interval;
   a commutator disposed at one end of the field pole generator and having a plurality of commutator segments arranged in a circular shape, the commutator segments being connected to the respective winding coils in a one-to-one correspondence;
   a rotating body including a direct current supply brush closely adhered to the outer circumferential surface of the commutator;
   a motor configured to rotate the rotating body;
   a slip ring mounted on a shaft of the motor; and
   a direct current supply unit configured to supply direct current power to the slip ring.

4. The apparatus according to claim 1, wherein the direct current supply brush is disposed on the outer circumferential surface of the rotating body and the commutator segments are formed in a circular shape on the inner circumferential surface of the commutator in such a manner that the direct current supply brush is positioned on the inner circumferential surface of the commutator, so that as a centrifugal force is gradually applied to the direct current supply brush by the rotation of the rotating body, the close contacting force between the direct current supply brush and the commutator segments of the commutator can be improved.

* * * * *